United States Patent
Chang

Patent Number: 6,043,933
Date of Patent: Mar. 28, 2000

[54] SPLIT OPTICAL ELEMENT AND A LOW COST FABRICATION APPROACH

[75] Inventor: Kok Wai Chang, Sunnyvale, Calif.

[73] Assignee: Hewlett-Packard Company, Palo Alto, Calif.

[21] Appl. No.: 08/975,615

[22] Filed: Nov. 21, 1997

[51] Int. Cl.[7] .................................................. G02B 5/30
[52] U.S. Cl. .................... 359/494; 359/495; 359/497; 359/900; 359/484
[58] Field of Search ................................ 359/484, 487, 359/489, 494, 495, 497, 900; 372/703

[56] References Cited

U.S. PATENT DOCUMENTS

| | | | |
|---|---|---|---|
| 2,535,781 | 12/1950 | Burchell | 359/489 |
| 2,647,440 | 8/1953 | Rehorn | 359/489 |
| 3,538,322 | 11/1970 | Arsem | 359/489 |
| 4,286,843 | 9/1981 | Reytblatt | 359/489 |
| 4,491,326 | 1/1985 | Halsey, III | 359/489 |
| 5,040,863 | 8/1991 | Kawakami et al. | 359/484 |
| 5,204,771 | 4/1993 | Koga | 359/281 |
| 5,305,137 | 4/1994 | Ohkawara | 359/484 |
| 5,452,122 | 9/1995 | Tsuneda et al. | 359/484 |
| 5,471,340 | 11/1995 | Cheng et al. | 359/281 |
| 5,574,596 | 11/1996 | Cheng | 359/484 |
| 5,734,763 | 3/1998 | Chang | 385/11 |
| 5,808,793 | 9/1998 | Chang et al. | 359/484 |
| 5,888,603 | 3/1999 | Fergason | 359/495 |

FOREIGN PATENT DOCUMENTS

| | | | |
|---|---|---|---|
| 0785456A1 | 7/1997 | European Pat. Off. | G02F 1/09 |
| 0860731A1 | 8/1998 | European Pat. Off. | G02F 1/09 |
| 03243911 | 10/1991 | Japan | G02B 27/28 |
| 404240804 | 8/1992 | Japan | 359/487 |

Primary Examiner—Ricky D. Shafer

[57] ABSTRACT

A method of fabricating split optical elements includes fixing a number of optical members in a side-by-side arrangement such that abutting optical members have different optical characteristics with respect to manipulating polarization components of light. In the preferred embodiment, the optical members are fixed to a transparent substrate by an optically transparent epoxy and the optical members are walk-off crystals having oppositely directed walk-off directions. The arrangement of optical members is segmented to form discrete optical elements comprising first and second portions supported on a segment of the transparent substrate. The first and second portions exhibit different optical characteristics with respect to manipulating polarization components. In one embodiment, the arrangement is segmented by dicing the optical members in a lengthwise direction in a first series of cuts and dicing the optical members in a widthwise direction in a second series of cuts. In a second embodiment, first and second series of cuts are both at acute angles to interfaces between adjacent optical members, yielding optical elements in which oppositely directed walk-off directions of the first and second portions of an element are parallel to the interface between the portions, but at an acute angle to the sides of the element.

9 Claims, 7 Drawing Sheets

SPLIT OPTICAL ELEMENT AND A LOW COST FABRICATION APPROACH

TECHNICAL FIELD

The invention relates generally to optical elements for manipulating polarization components of propagating light and more particularly to methods of fabricating split optical elements.

BACKGROUND ART

The flexibility and reliability of communication networks based upon transmissions of light signals via optical fibers have been significantly increased by the availability of assemblies such as optical circulators and isolators. For example, a three-port circulator may be used to enable a single fiber to be used for bidirectional communications between two remote sites. By utilizing non-reciprocal optical elements, i.e. elements which affect light moving in different directions differently, a bidirectional fiber may be optically coupled to both an input fiber and an output fiber. Non-reciprocal operations provide differences in "walk-off," i.e. spatial displacement, of oppositely directed light beams, so that the input and output fibers are optically isolated from each other.

An optical isolator may include only single-mode fibers. An input fiber directs light signals into an optical assembly that splits the light into polarization components, performs non-reciprocal operations on the components, and recombines the components for output at an output fiber. The non-reciprocal operations are designed to reduce the likelihood that back-directed light will be aligned with the input fiber.

Systems that include optical circulators or isolators often have two or more fibers in a parallel relationship at one end of an assembly of optical elements which manipulate the polarization components of beams propagating through the assembly to or from one of the parallel fibers. Typically, each element in such an assembly is a unitary member within the path of all polarization components, even within systems designed to handle two parallel beams differently. This may require a greater number of optical elements within the assembly, thereby increasing signal crosstalk among fibers. Crosstalk within an optical circulator or isolator is the transmission of light from an input fiber to a fiber which is not the intended output fiber. One cause of signal crosstalk is back-reflection from various optical elements within the assembly.

As an alternative to the unitary optical elements, some optical circulators and isolators include divided optical elements. U.S. Pat. No. 5,204,771 to Koga describes an optical circulator having a divided optical element. One portion of the optical element is a reciprocal clockwise rotator, and the adjacent portion is a reciprocal counterclockwise rotator. Incoming light is separated into two components by a double refraction crystal plate that immediately precedes the divided element. The crystal plate directs one light component into the reciprocal clockwise rotator and the other light component into the reciprocal counterclockwise rotator. This allows the two light components to be separately but simultaneously manipulated. The Koga patent includes embodiments in which a single optical element has four portions that provide selective light component rotation. U.S. Pat. No. 5,471,340 to Cheng et al. also describes an optical assembly having a divided component-rotation element. The divided element is similar to the elements of Koga, since it is designed to achieve independent polarization rotation and includes rectangular element portions.

U.S. patent application Ser. No. 08/805,001 to Chang, filed Feb. 25, 1997, and assigned to the assignee of the present invention, also describes a split polarization rotator. A Faraday rotator is at a rearward side of the split polarization rotator. An incoming beam is divided into first and second polarization components. One polarization component passes through the "positive half" of the split polarization rotator and is rotated 45° counterclockwise, but then is returned to its original orientation by a 45° clockwise rotation induced by the Faraday rotator. On the other hand, the second polarization component passes through the "negative half" of the split polarization rotator, which causes a 45° clockwise rotation prior to a second 45° clockwise rotation by the Faraday rotator. Thus, the first polarization component is rotated a total of 0° and the second polarization component is rotated by a total of 90°. This Chang reference describes a method of fabricating the split polarization component. A pair of half-wave plate blocks having the desired optical properties for component rotation is provided. Each of the blocks is divided equally in a lengthwise dimension. A half from one of the blocks is coated with a thin layer of a suitable adhesive and brought into contact with a half from the other block. The adhesive is cured to form the split polarization rotator. A second split polarization rotator may be formed using the remaining two halves of the two blocks. While the method of manufacture operates well for its intended purpose, the process is labor intensive.

What is needed is a cost-efficient method of fabricating split optical elements which allow polarization components to be independently manipulated. Also needed is a split walk-off element that facilitates independent spatial separations of the polarization components.

SUMMARY OF THE INVENTION

A method of fabricating split optical elements en masse includes aligning a group of optical members in a side-by-side arrangement such that each optical element has at least one surface that abuts a surface of an adjacent optical member having different optical properties with respect to manipulating polarization components of light. The desired manipulation of polarization components may be polarization rotation, but the preferred embodiment is one in which the manipulation is a controlled walk-off of a polarization component. In this preferred embodiment, the adjacent optical members have opposite walk-off directions.

The optical members may be bars in which the abutting surfaces are at opposite lengthwise sides of each bar, other than the end bars. The bars are all fixed to a thin optically transparent substrate, such as a glass substrate. The substrate supports the optical members during a dicing step that segments the optical members to form discrete split optical elements, with each element having two portions with different optical properties.

In one embodiment, the dicing procedure is implemented by first and second series of cuts through the substrate and the optical members. Each optical member is cut in the lengthwise direction into two equal segments. In the widthwise direction, the second series of cuts is formed to provide the discrete optical elements. Each of the elements includes a segment of the glass substrate supporting two dimensionally equal, but optically different, portions of two optical members. The thickness of the two portions depends upon the intended application, since there is a direct relationship between walk-off distance and the thickness of a walk-off crystal. As an example of this embodiment, if thirty bars of walk-off crystal having a length of 10 mm are epoxied to a glass substrate with an alternating pattern of walk-off directions, the lengthwise cuts will form twenty-nine split optical elements and two end segments that can be epoxied together to form the thirtieth split optical element. If the desired length is 1 mm, each of the thirty elements may be diced in the widthwise direction to form ten discrete, substratesupported split elements. As a result, three hundred elements are fabricated.

In another embodiment, the first and second series of cuts into the optical members are at acute angles to the interfaces of adjacent optical members. For example, +45° cuts and −45° cuts may intersect only at interfaces between bars. The number of split optical elements formed by these cuts will have a 1:2 ratio to the number of bars. This compares to the 1:1 ratio achieved by the first embodiment in which cuts are parallel and perpendicular to the interfaces, but the thicknesses of the bars in this second embodiment need only be 50% of the thicknesses of the bars in the first embodiment.

If the optical elements that are fixed to the substrate are walk-off crystals having alternating walk-off directions, and if the cuts are formed at 45° angles relative to interfaces, the resulting yield of split optical elements will be elements that are divided diagonally into first and second portions having opposite walk-off directions that are each parallel to the diagonal split. These optical elements facilitate the alignment process in assembling the elements within an optical circulator or isolator.

The fabrication process reduces the cost of forming split optical elements by allowing the elements to be formed en masse. A given number of split optical elements may be fabricated with fewer saw-to-crystal precision alignments than are required for conventional fabrication procedures. Another advantage is that the second embodiment facilitates fiber-to-optical element precision alignments.

DETAILED DESCRIPTION

Figure 1:
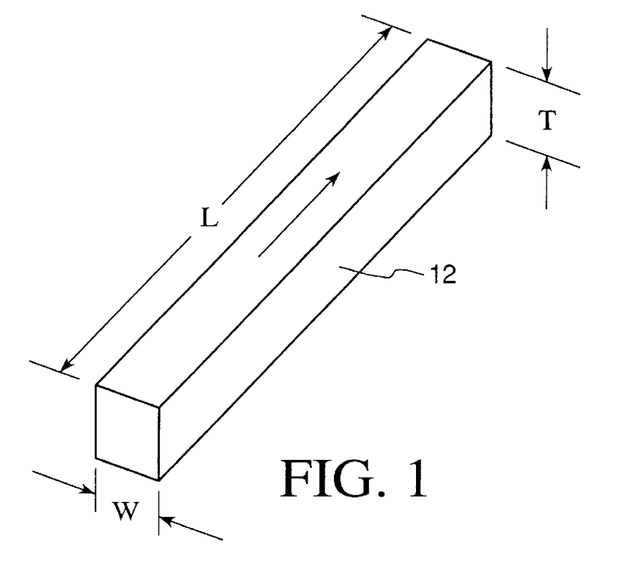
FIG. 1 is a perspective view of an optical member for fabricating one portion of a split optical element in accordance with the invention.
Figure 2:
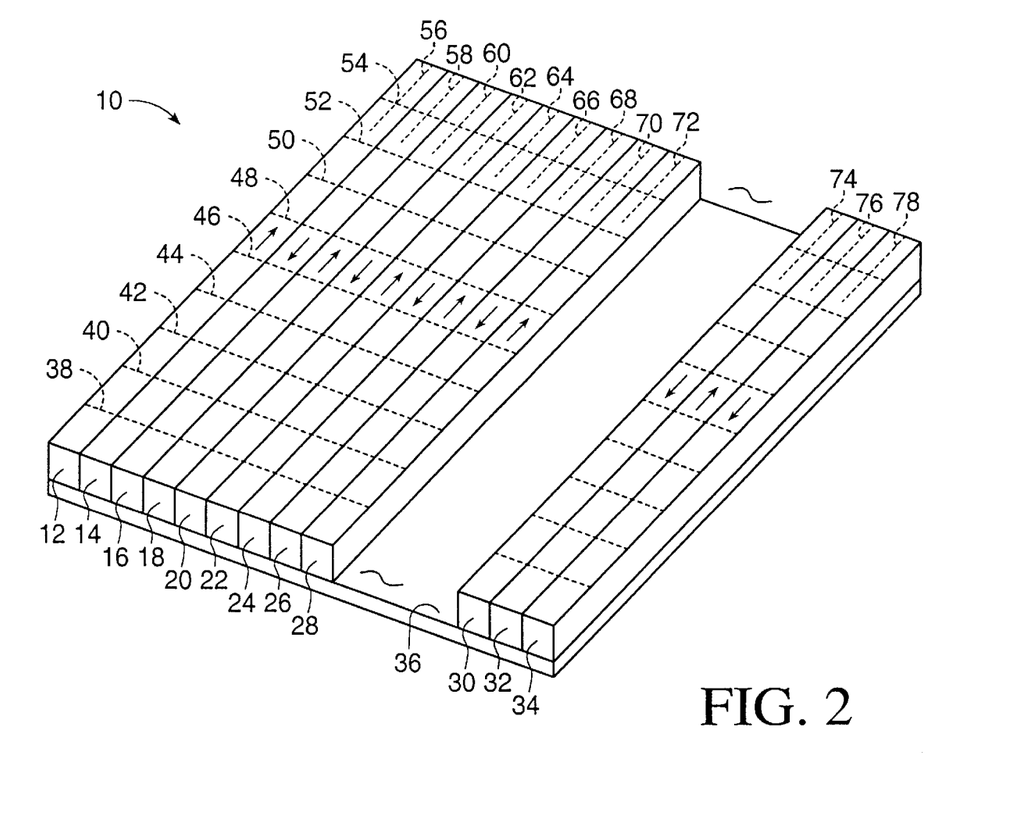
FIG. 2 is a perspective view of an array of optical members having an alternating pattern of walk-off directions and having dashed lines that are indicative of segmenting the optical members in accordance with one embodiment of the invention.

With reference to FIGS. 1 and 2, an array 10 of optical members 12, 14, 16, 18, 20, 22, 24, 26, 28, 30, 32 and 34 is shown as being fixed to a substrate 36. As will be explained more fully in a description of a fabrication procedure, segments of adjacent optical members are utilized to form split optical elements having first and second portions that exhibit different optical characteristics. Thus, the array 10 must comprise optical members that possess different optical properties. If the array includes two types of optical members (type "a" and type "b"), in the preferred embodiment the optical properties of each member are distinguishable from both adjacent members, so that the pattern is a, b, a, b . . . However, some applications of the fabrication procedure may benefit from having the alternating pattern applied to adjacent pairs of optical members, rather than to all adjacent optical members. In this less preferred embodiment, the pattern would be a, bb, aa, bb, . . . , rather than the pattern of a, b, a, b, . . .

The difference in optical properties relates to the manipulation of at least one polarization component propagating through the optical members 12–34 in the thickness (T) direction. The manipulation may be polarization rotation, such as that achieved using half-wave plates. However, in the preferred embodiment, the optical members are walk-off crystals. The alternating pattern of walk-off directions is shown by the arrows atop the individual optical members 12–34.

Acceptable materials for forming the walk-off crystals include rutile (titanium dioxide-$TiO_2$) or yttrium vanadate ($YVO_4$). As is well known in the art, the thickness of a walk-off optical element is dictated by the desired spatial displacement of a polarization component having a particular alignment during propagation through the crystal. For example, in order to achieve 0.0885 mm of walk-off separation, a rutile crystal may have a thickness of approximately 0.885 mm.

The length (L) of the optical members 12–34 should be sufficient to accommodate the walk-off separation that is determined by the thickness T of the members. Beyond this optical requirement, there is a practical requirement of providing sufficient length and width to facilitate handling and to provide sufficient structural integrity. An acceptable length is 1.0 mm, but the dimension L in FIG. 1 is preferably an integer multiple of the desired length, so that a significant number of split optical elements may be formed from the array 10. Walk-off crystal bars having a length of 20 mm are commercially available. If the desired length for each split optical element that is formed from the array is 1.0 mm, the length of the crystal bar of FIG. 1 may be 10.0 mm (i.e, L=10 mm), so that nine cuts may be formed through the array to yield a total of three hundred split optical elements when there are thirty crystal bars. In order to achieve this yield, nine cuts are formed to the widthwise direction of the bars. The nine cuts are shown by dashed lines 38, 40, 42, 44, 46, 48, 50, 52 and 54 in FIG. 2. The width W of each bar may be approximately the same as the length after the nine cuts have been formed. That is, the width may be 1.0 mm. However, the geometry of the bars of optical material is not critical to the fabrication procedure.

The substrate 36 is formed of a thin optically transparent material. The substrate may be a glass slide having a thickness of approximately 100 μm. The optical members 12–34 are fixed to the substrate by an optically transparent epoxy. Known epoxies for adhesively securing adjacent optical elements within a circulator or isolator may be used to secure the members 12–34 to the glass substrate. Since rutile has an index of refraction of approximately 2.4 and optically transparent epoxies used in the art have an index of refraction of approximately 1.52, the bottom surfaces of the optical members preferably include an antireflection coating to improve performance by reducing the refractive index mismatch at the interface. It is also preferable to provide an antireflection coating on the upper surface of each optical member. An acceptable antireflection coating is a multi layer alternating pattern of silicon dioxide ($SiO_2$) and titanium dioxide ($TiO_2$) layers.

The side surfaces of the optical members 12–34 that abut side surfaces of adjacent optical members are preferably optically polished. The polishing provides a smooth surface to allow the precision alignment of a split optical element relative to closely spaced optical fibers. A center-to-center distance between two fibers may be approximately 125 μm, so that scratches in the abutting surfaces of the split optical elements may adversely affect the performance of a device, such as a circulator or isolator.

In addition to the widthwise cuts 38–54 in FIG. 2, each optical member 12–34 is equally divided in the lengthwise direction. Referring to the end view of the array 10 in FIG. 3, lengthwise cuts 56, 58, 60, 62, 64 and 66 are shown as segmenting optical members 12, 14, 16, 18, 20 and 22, respectively. Partial lengthwise cuts 56–66 and 68, 70, 72, 74, 76 and 78 are shown by dashed lines in FIG. 2. The dicing procedure may be implemented by use of a dicing saw, as is well known in the art. However, other means for segmenting the optical members may be used, such as cleaving.

The order of forming the widthwise cuts 38–54 and the length-wise cuts 56–78 is not critical to the invention. However, there may be materials-handing advantages to forming the lengthwise cuts first.

Figure 3:
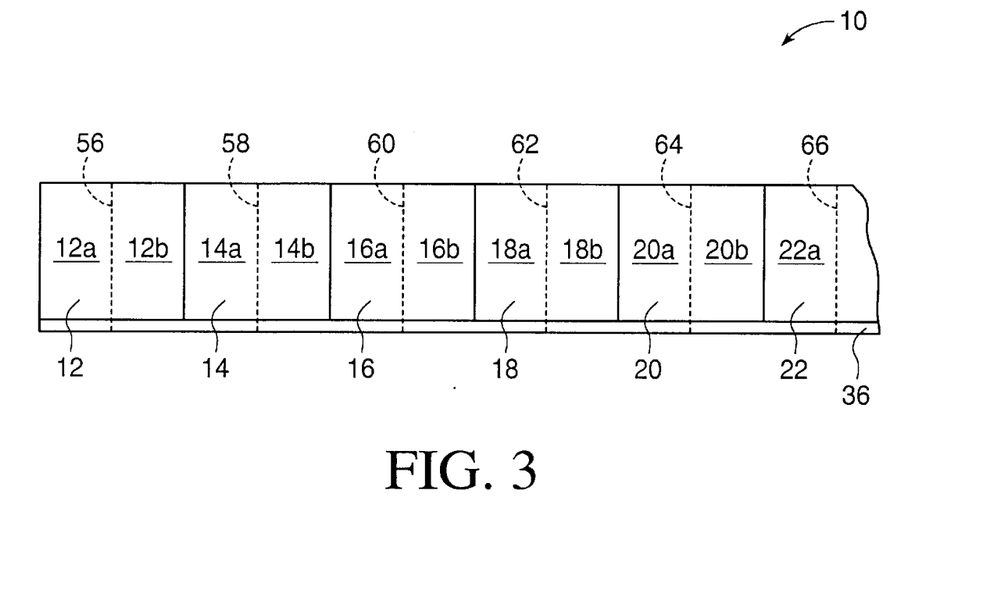
FIG. 3 is an end view of a portion of the array of FIG. 2, with dashed lines to indicate the lengthwise dicing of the optical members.
Figure 4:
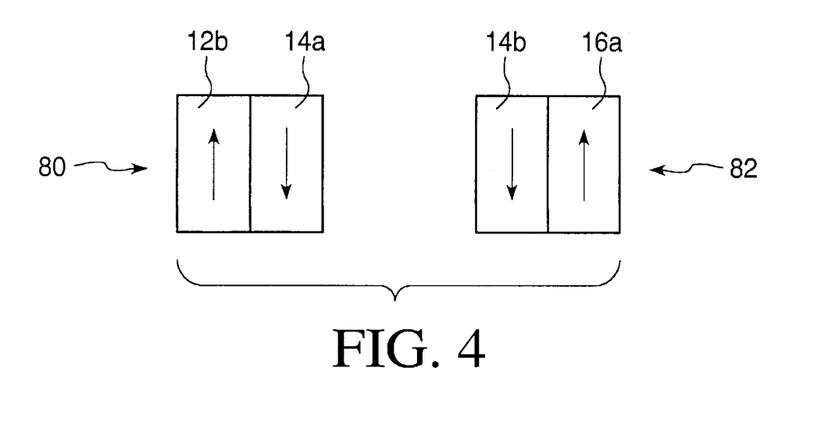
FIG. 4 is a top view of two split optical elements formed by dicing the optical members along dashed lines indicated in FIGS. 2 and 3.

Each of the cuts 38–54 and 56–78 extends through the glass substrate 36. As best seen in FIG. 3, each lengthwise cut 56–66 separates one of the optical members 12–22 into two equal segments "a" and "b." However, the glass substrate 36 remains intact at the interfaces between each segment "b" of one optical member with the segment "a" of the abutting optical member. For example, one split optical member is formed from the combination of 12*b* and 14*a*, while a second split optical member is formed by the combination of 14*b* and 16*a*. A top view of these two split optical elements 80 and 82 is shown in FIG. 4. If there are thirty optical members 12–34 and nine widthwise cuts 38–54, the fabrication procedure will yield one hundred fifty optical elements identical to element 80 and one hundred fifty optical elements identical to element 82. This yield requires that the end segment 12*a* of the first optical member 12 be adhered to the end segments of the last optical element 34 in the array. In the preferred embodiment, no other segments are adhered to each other to form the split optical elements. Rather, the segments are connected by means of the glass substrate.

For each of the two split optical elements 80 and 82 in FIG. 4, there are two portions that exhibit different optical characteristics. In the embodiment in which the adjacent optical members of FIG. 2 are walk-off crystals, the fabricated split optical elements 80 and 82 will have oppositely directed spatial displacement. Consequently, if the element 80 is positioned such that segment 12*b* is in alignment with a first optical fiber and segment 14*a* is in alignment with a second optical fiber, the appropriately oriented polarization components of output beams from the two fibers will be simultaneously but independently manipulated.

Figure 5:
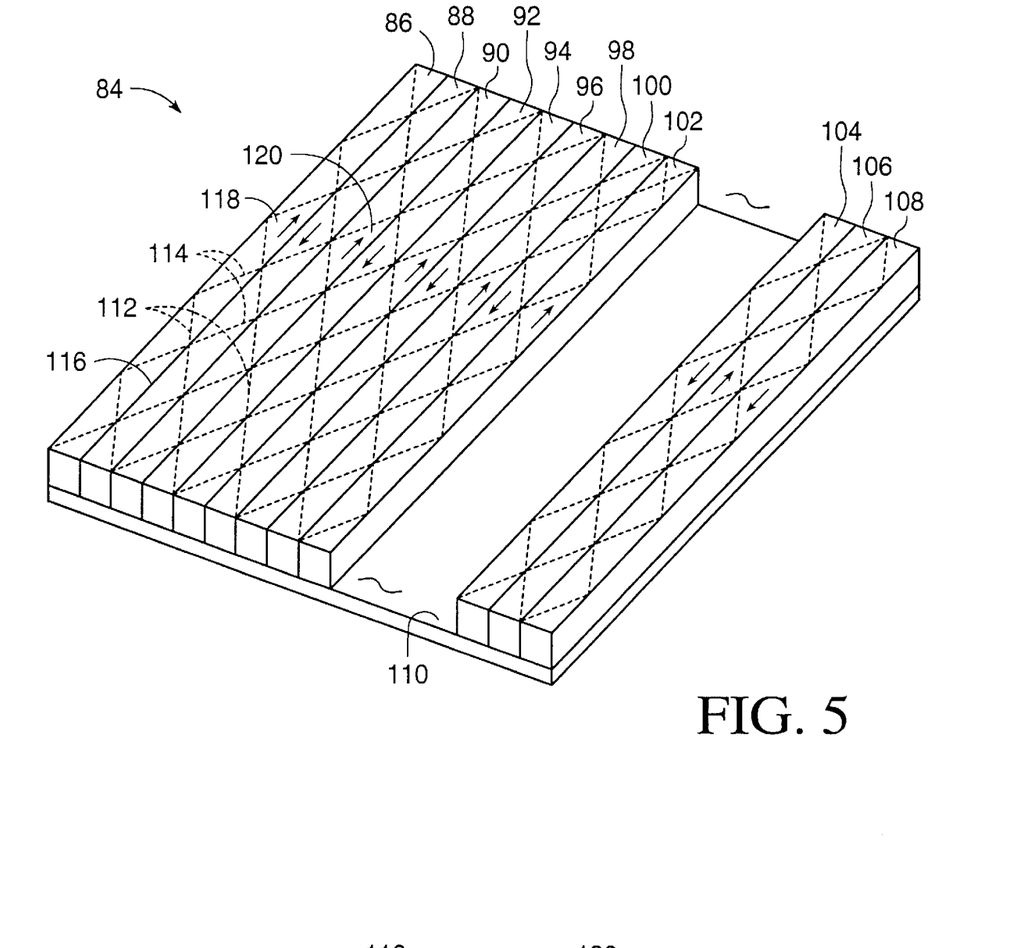
FIG. 5 is a perspective view of an array of optical members having dashed lines indicating desired cuts in accordance with the second embodiment of the invention.
Figure 6:
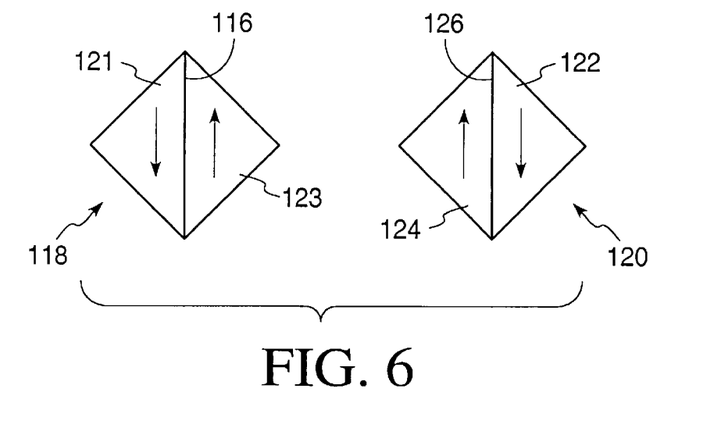
FIG. 6 is a top view of two split optical elements formed by dicing the optical members along the dashed lines of FIG. 5.

Another embodiment of the fabrication method is illustrated in FIGS. 5 and 6. An array 84 of optical members 86, 88, 90, 92, 94, 96, 98, 100, 102, 104, 106 and 108 is generally equivalent to the optical members of FIGS. 1 and 2, but has a width W that is approximately half of that of FIG. 1. The 50% reduction in width can be combined with the doubling of the number of optical members on a glass substrate 110 to yield the same number of optical elements described with reference to the procedure of FIGS. 1–4. The example that was given in describing the fabrication of FIGS. 1–4 included thirty optical members 56–78, with each optical member having a width W of 1.0 mm. If the glass substrate 110 of FIG. 5 is dimensionally identical to the substrate 36 of FIG. 2, the same number (n=300) of split optical elements may be formed if the substrate 110 includes sixty optical members 86–108, with each having a width of 0.5 mm.

The desired cuts for forming the split optical elements are shown by dashed lines 112 and 114 in FIG. 5. The series of cuts 112 are parallel to each other and at acute angles to the interfaces between adjacent optical members 86–108. The series of cuts 114 are also parallel to each other. With reference to an interface 116 between optical member 86 and optical member 88, each of the cuts 112 may be considered to be at a +45° angle to the interface, while the cuts 114 may be considered to be at a −45° angle. Referring to FIG. 6, split optical elements 118 and 120 fabricated according to this method will each include a first portion 121 and 122 and a second portion 123 and 124 with oppositely directed spatial displacements for appropriately aligned polarization components.

A similarity between the procedure of FIGS. 2–4 and the procedure of FIGS. 5 and 6 is that after the dicing steps of the two procedures first and second portions of the fabricated split optical elements are held in place relative to each other by a segment of the glass substrate on which the optical members are secured. Another similarity is that the first and second portions have opposite walk-off directions that are both parallel to the interface of the two portions. However, an important difference between the split optical elements 80 and 82 of FIG. 4 and the split optical elements 118 and 120 of FIG. 6 is that the sides of the elements 118 and 120 are not parallel to the walk-off directions. In the embodiment of FIG. 6, the walk-off directions are at ±45° with respect to the saw edges. As will be explained more fully below, the split optical elements 118 and 120 having the diagonal interfaces 116 and 126 may be used for achieving polarization mixing.

Figure 7:
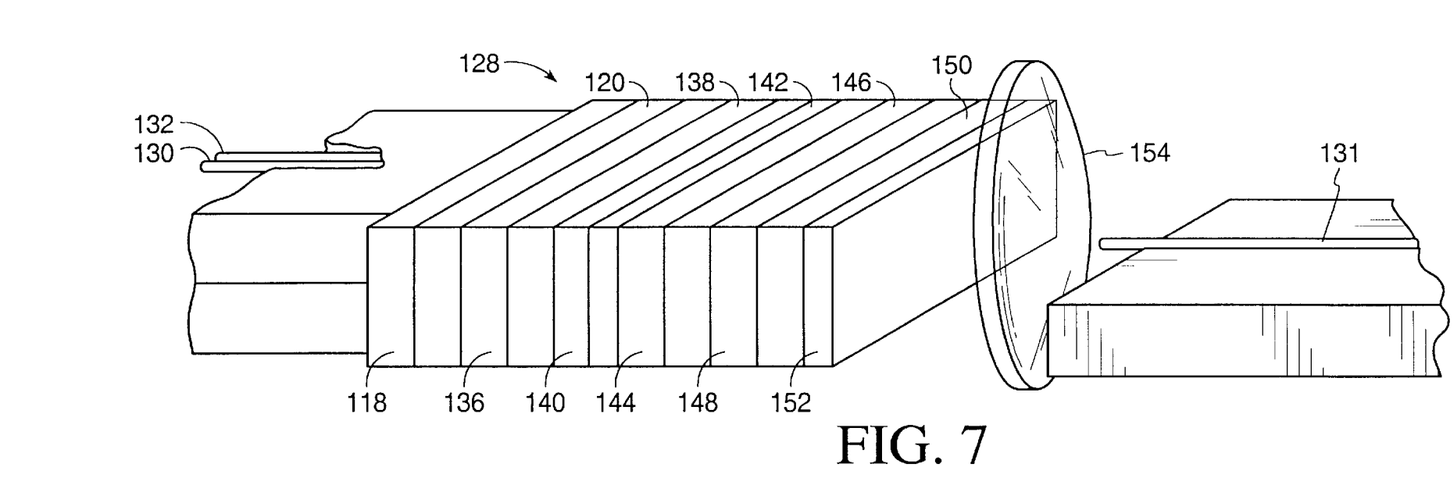
FIG. 7 is a perspective view of one embodiment of an optical assembly that utilizes the split optical elements fabricated according to the embodiment of FIGS. 5 and 6.
Figure 8:
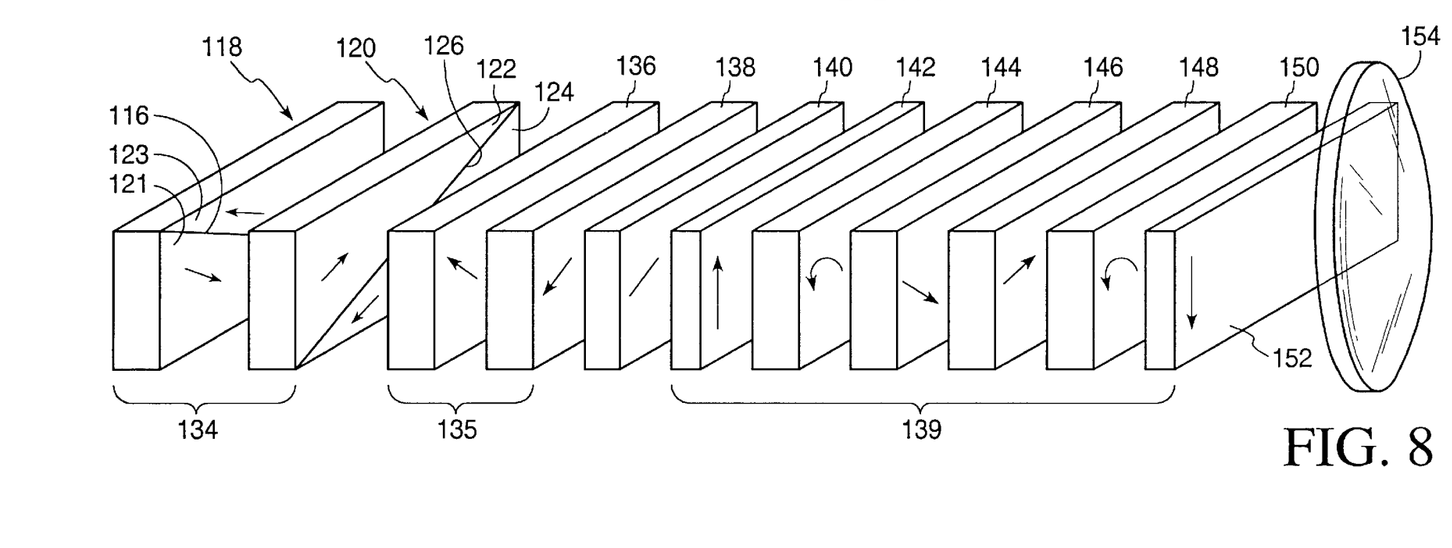
FIG. 8 is a perspective exploded view of the optical assembly of FIG. 7.

With reference to FIGS. 7 and 8, the split optical elements 118 and 120 are utilized in an optical assembly 128 to provide polarization mixing. The assembly is shown as having parallel first and third optical fibers 130 and 132 at a forward end and having a second optical fiber 131 at a rearward end. In the embodiment of FIG. 1, the assembly is an optical circulator in which an input beam from the first fiber 130 propagates through the various optical elements for output via the second fiber 131, while an input signal from the second fiber is output via the third fiber 132. However, all other possibilities of optical coupling among the fibers are blocked by operations of the various elements on the polarization components of the beams from the fibers.

In the embodiment of FIGS. 7 and 8, the first two optical elements 118 and 120 at the forward end of the assembly 128 form a polarization mixer 134. The elements 118 and 120 are the split optical elements of FIG. 6. As will be described more fully below with reference to FIGS. 9–20, forward propagation of light beams from the first and third fibers 130 and 132 through the polarization mixer 134 results in two light beams in which each has one polarization component from the beam of fiber 132 and one polarization component from the beam of fiber 131. This "mixing" of polarization components sets the stage for a polarization combinor 135 formed by the third and fourth optical elements 136 and 138 in the assembly 128. The polarization combinor re-merges the two polarization components of the first beam from the first fiber 130 and shifts the two polarization components of the third beam from the third fiber 132 to opposite sides of the re-merged first beam. In turn, this arrangement of the polarization components sets the desired orientation for a two-stage optical isolator array 139 that will be described more fully below. The elements of the assembly 128 combine to form a high performance, cost efficient optical circulator.

As best seen in FIG. 8, the elements 118 and 120 that form the polarization mixer 134 are the split optical members that are diagonally divided into upper portions 122 and 123 and lower portions 121 and 124. The interface 116 of the upper and lower portions and of the first element 118 is perpendicular to the interface 126 of the upper and lower portions and of the second element 120. Each of the four portions is formed of a walk-off crystal, and the two portions of each of the two elements have oppositely directed walk-off directions. The walk-off directions are indicated by arrows on the four portions 121–124 in FIG. 8.

The two elements 136 and 138 of the polarization combinor 135 are also formed of walk-off crystal. The walk-off directions are perpendicular to each other, but are directed to the same lateral surface of the assembly 128. As is well known in the art, common materials for forming walk-off crystals are rutile (titanium dioxide-$TiO_2$) and yttrium vanadate ($YVO_4$). The preferred material is rutile, since it provides a greater refractive index. For each one mm of walk-off separation, the rutile crystal must have a thickness of approximately 10.0 mm. In the embodiment of FIGS. 7 and 8, if the core-to-core pitch of the first and third fibers 130 and 132 is 250 $\mu$m, the preferred walk-off distance may be $\sqrt{2}$ times one-half the pitch. Therefore, the thickness of each of the elements 118, 120, 136 and 138 should be selected to provide a walk-off distance of $\sqrt{2}$ 125$\mu$m=177$\mu$m.

The optical element 140 that is at the rearward face of the walk-off crystal 138 is a half-wave plate that provides polarization rotation. The optical axis of the half-wave plate is 22.5° to the vertical, so that rotation of the polarization states is 45°. Half-wave plates are well known in the art.

As previously noted, the following optical elements provide a two-stage isolator array 139. A first element 142 in the array is a walk-off element which may have a thickness to provide a spatial displacement of 125$\mu$m, but this walk-off distance is not critical to the invention. The walk-off direction is upward, as shown by the arrow in FIG. 8.

The two-stage optical isolator array 139 includes two Faraday rotators 144 and 150 that sandwich a pair of walk-off crystals 146 and 148. Each of the Faraday rotators causes the polarization components of beams to rotate 45°. In the forward direction, the Faraday rotators cause counterclockwise rotation, as indicated by the arrows. The walk-off crystals 146 and 148 may have a thickness to provide a spatial displacement of 177$\mu$m in the preferred embodiment described above. The walk-off directions are perpendicular to each other, but have a major directional component toward the distant lateral side of the assembly 128, as viewed in FIGS. 7 and 8. The last element 152 of the two-stage isolator array 139 is a walk-off crystal having a walk-off direction that is downward and a walk-off distance of 125$\mu$m. The thickness will depend upon the desired walk-off distance, as previously noted.

The two-stage optical isolator array 139 is followed by an imaging lens 154 that is used to focus the output beam from the first fiber 130 onto the second fiber 131 that is to output the beam. If all of the fibers 130, 131 and 132 are thermally expanded core (TEC) fibers, the lens 154 is a one-to-one imaging lens. However, in an embodiment in which the first fiber 130 is a TEC fiber and the second fiber 131 is a conventional single-mode fiber, the lens may be a four-to-one imaging lens. The lens reconverges the polarization components of the first beam from the first fiber 130, which diverge as they pass through the optical assembly 128. The focal length of the lens is selected based upon forming an image of the first beam onto the second fiber 131.

Figure 9:
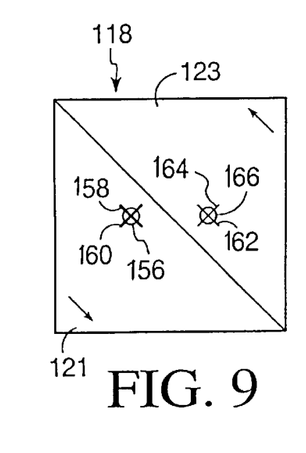
FIGS. 9–20 illustrate the operations performed upon polarization components during forward propagation through the assembly of FIGS. 7 and 8.

FIGS. 9–20 illustrate forward propagation of polarization components of first and second light beams from the first and second fibers 130 and 131 of FIG. 7. Each of the twelve figures is an illustration of the positions of the polarization components at a forward face of one of the twelve components of FIG. 8. In FIG. 9, the optical axis of the first fiber defines a first port 156, i.e., window, at the forward face of the polarization mixer 134 that is defined by the two split elements 118 and 120. The orthogonal polarization components 158 and 160 of the first beam are illustrated as thickened black lines in FIG. 9. In comparison, polarization components 162 and 164 of the third beam from the third fiber define a window 166 at the forward face of the split element 118.

Figure 10:
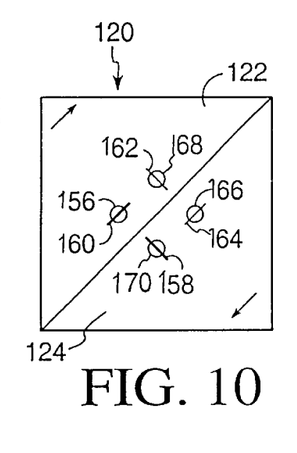

The optical axis of the first beam is aligned with the lower portion 121 of the first split element 118, while the optical axis of the third beam is aligned with the upper portion 123. As a result of the walk-off operations of the upper and lower portions (the walk-off directions are shown by arrows in FIG. 9), the first polarization component 158 and the third polarization component 162 are shifted to locations 168 and 170 when the forwardly propagating four polarization components 158–164 reach the forward face of the second split element 120, as shown in FIG. 10. The second polarization component 160 and the fourth polarization component 164 are in alignment with the walk-off directions of the upper portion 122 and lower portion 124 of the second element 120 within the polarization mixer 134. Consequently, the walk-off operations of the two portions 122 and 124 walk-off the second and fourth polarization components to the two shifted locations 168 and 170. This orientation of the four polarization components occurs at the forward face of the walk-off crystal 136 that is the first block of the pair of walk-off crystals that forms the polarization combinor described above. The orientation is shown in FIG. 11.

Figure 11:
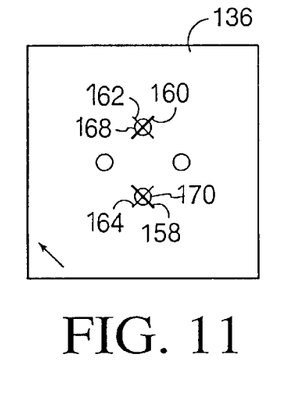

Comparing FIGS. 9 and 11, the polarization mixer that is formed by the two optical elements 118 and 120 combines one of the polarization components 158 from the first port 156 with one of the polarization components 164 from the second port 166, and the remaining two polarization components are also combined. The "mixed" polarization components are on the forward propagation paths indicated by shifted locations 168 and 170 in FIG. 11.

Figure 12:
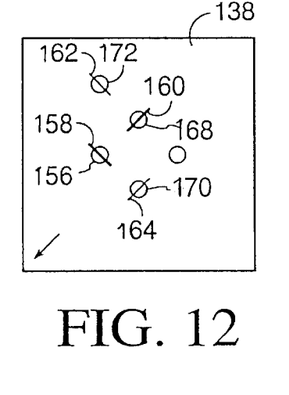

The walk-off operation of the forward element 136 of the polarization combinor shifts the first polarization component 158 back to the position of the window 156 and shifts the third polarization component 162 to a location 172, as shown in FIG. 12.

Figure 13:
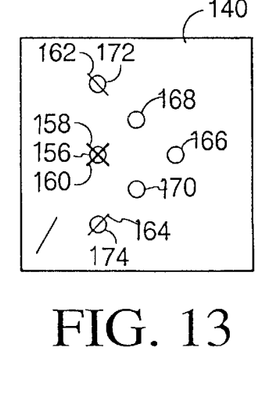

FIG. 13 illustrates the four polarization components 158–164 after the second element 138 of the polarization combinor has shifted the second and fourth polarization components 160 and 164. The first and second polarization components 158 and 160 that form the input beam from the window 156 are returned to the original position of FIG. 9, but the third and fourth polarization components 162 and 164 that originally formed the beam at window 166 are at locations 172 and 174 on opposite sides of the window 156 and are isolated from each other by a distance greater than the separation between the original windows 156 and 166.

Figure 14:
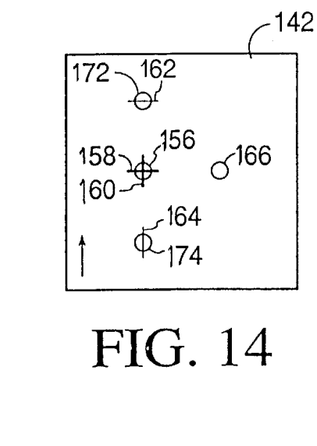

The four polarization components 158–164 are rotated in place by operation of the half-wave plate 140. The use of half-wave plates is well known in the art. FIG. 14 illustrates the rotated alignment directions of the four polarization components at original window 156 and at shifted locations 172 and 174. The four polarization components are then introduced into the two-stage optical isolator array 139 of FIG. 8.

The first element 142 of the two-stage optical isolator array 139 is the walk-off crystal having the upwardly directed walk-off direction. This causes the vertically oriented second and fourth polarization components 160 and 164 to shift upwardly to locations 176 and 178 in FIG. 15. As previously noted, the thickness of the walk-off crystal 142 is less than the thickness of previously encountered walk-off crystals. For example, the thickness of the crystals 136 and 138 may each be approximately $10 \times \sqrt{2}$ a, while the thickness of the crystal 142 may be approximately $10a$, where "a" is one-half of the pitch between the two windows 156 and 166. In one preferred embodiment, the value of a is $125 \mu m$, so that the walk-off crystals 136 and 138 are each approximately $1,770 \mu m$ and the thickness of the walk-off crystal 142 is approximately $1,250 \mu m$. However, the value of a is not critical to the invention.

Figure 15:
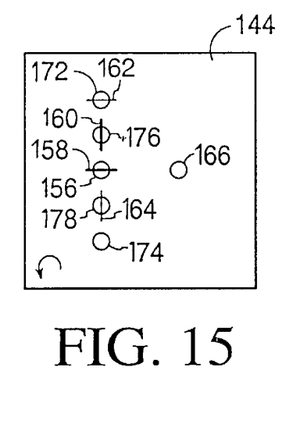
Figure 16:
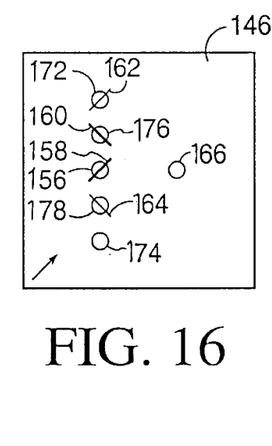
Figure 17:
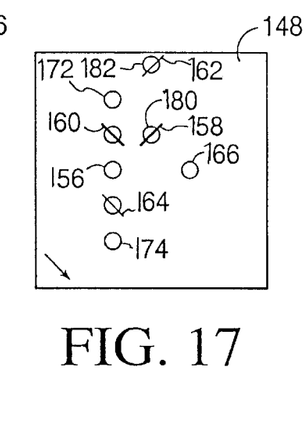
Figure 18:
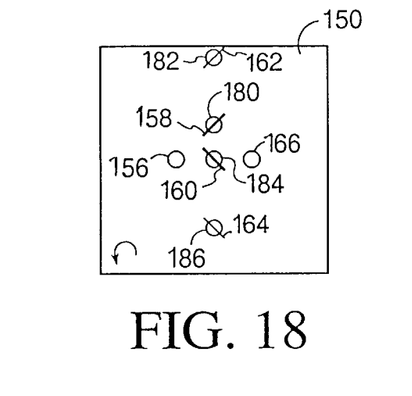

The four polarization components 158–164 are rotated 45° by Faraday rotator 144 of FIG. 15 to provide the polarization orientation shown in FIG. 16. The walk-off crystal 146 shifts the positions of the first and third polarization components 158 and 162 to locations 180 and 182, respectively. This temporarily places the two polarization components 158 and 160 of the beam that entered at the window 156 in the side-by-side relationship illustrated in FIG. 17. However, the second walk-off crystal 148 in the pair then shifts the second and fourth polarization components to the locations 184 and 186 shown in FIG. 18.

Figure 19:
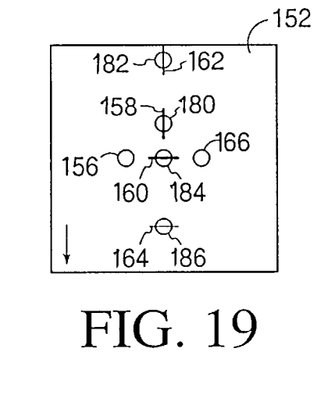
Figure 20:
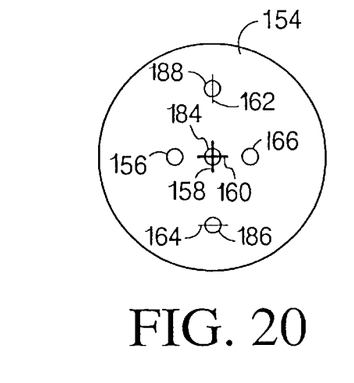

The second Faraday rotator 150 rotates the polarization orientations of all four components 158–164, so that the polarization components are oriented as shown in FIG. 19 when the components reach the forward face of the walk-off crystal 152. The walk-off direction of the crystal 152 is downward. Consequently, the first and third polarization components 158 and 162 are displaced by a distance determined by the thickness of the crystal 152. For a rutile crystal having a thickness of approximately $1,250 \mu m$, the downward shift is equal to approximately $a=125 \mu m$. The third polarization component 162 is shifted to location 188. The first polarization component 158 is shifted to the location 184, which corresponds to the optical axis of the second fiber 131 described with reference to FIG. 7. Thus, the polarization components 158 and 160 that were input from the window 156 defined by the first optical fiber 130 (see FIG. 9) are the output signal for the second optical fiber 131. The imaging lens 154 focuses the image onto the second optical fiber. On the other hand, the two polarization components 162 and 164 that are input at the window 166 (see FIG. 9) from the third fiber are isolated from each other and from output through the second fiber, as shown by the locations 186 and 188 in FIG. 20.

Figure 21:
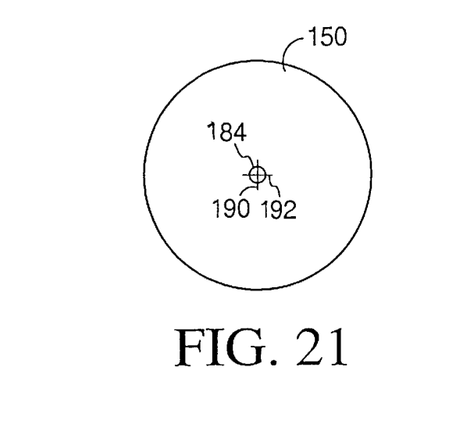
FIGS. 21–32 illustrate operations performed upon polarization components during rearward propagation through the assembly of FIGS. 7 and 8.

FIGS. 21–32 illustrate rearward propagation from the second optical fiber 131 to the third optical fiber 132. As previously noted, the location 184 in FIG. 21 corresponds to the port for input/output signals to and from the second fiber. In FIG. 21, polarization components 190 and 192 are shown as the components of an input beam from the second fiber. In order to distinguish from the polarization components of the forwardly propagating beams in FIGS. 9–20, the polarization components of the input beam from the second fiber will be referred to as the fifth and sixth polarization components 190 and 192.

Figure 22:
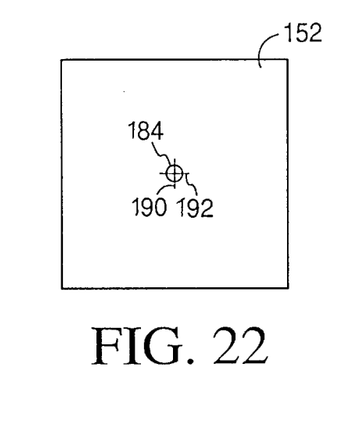
Figure 23:
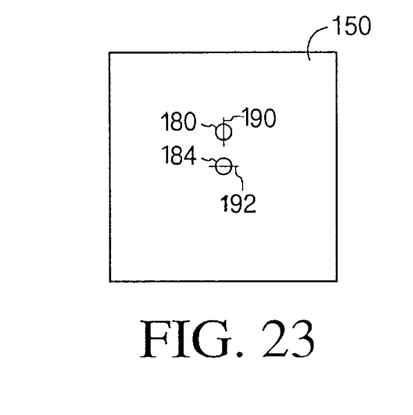
Figure 24:
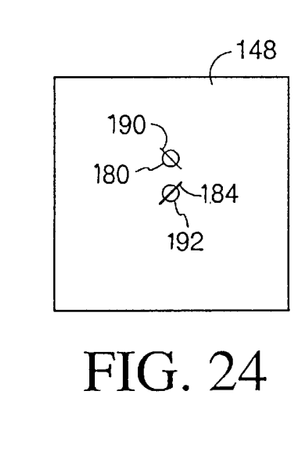

The imaging lens 154 allows the fifth and sixth polarization components to pass to the rearward face of the walk-off crystal 152 without effect upon orientation or position, as shown in FIG. 22. However, the walk-off crystal 152 shifts the fifth polarization component upwardly to the position 180 shown at the rearward face of the Faraday rotator 150 in FIG. 23. The Faraday rotator causes the polarizations to rotate 45° to the alignments shown in FIG. 24 at the rearward face of the walk-off crystal 148.

Figure 25:
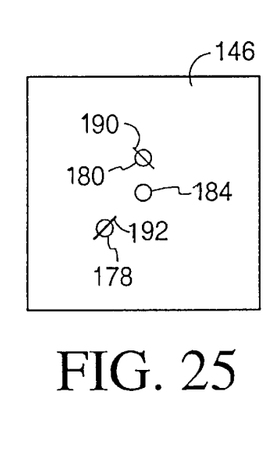
Figure 26:
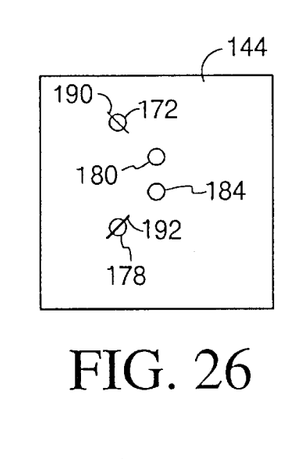
Figure 27:
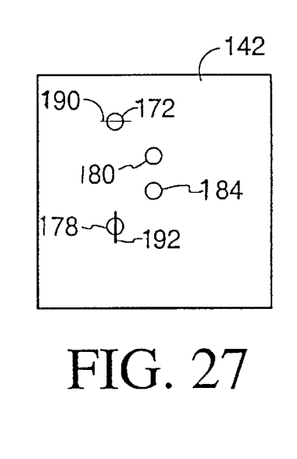

The walk-off crystal 148 displaces the sixth polarization component 192 to the position 178 of FIG. 25. The other walk-off crystal 146 in the pair then shifts the fifth polarization component 190 to the position 172 as the rearwardly propagating beam components reach the rearward face of the Faraday rotator 144 in FIG. 26. The Faraday rotator initiates counterclockwise rotation of the two polarization components 190 and 192 to the orientation shown in FIG. 27 on the rearward face of the walk-off crystal 142.

Figure 28:
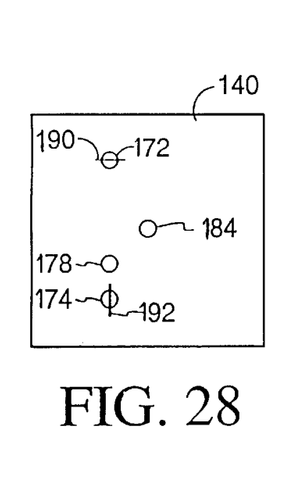
Figure 29:
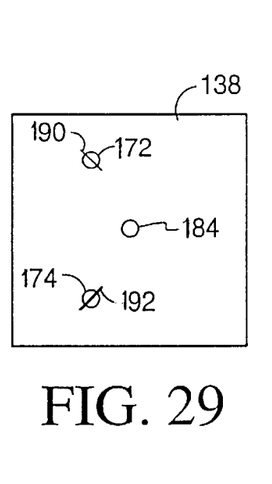

In FIG. 28, the sixth polarization component 192 has been displaced downwardly by operation of the walk-off crystal 142. The half-wave plate 140 rotates the two polarization components 190 and 192 to the orientation shown in FIG. 29. FIG. 29 shows the interface between the half-wave plate 140 and the polarization combinor 135 of FIG. 8. This interface between the polarization combinor and the half-wave plate is also represented in FIG. 13 for the forwardly propagating polarization components. Comparing FIG. 13 with FIG. 29, it can be seen that the third and fourth polarization components of the beam from the third fiber 132 are identical in position and orientation to the fifth and sixth polarization components 190 and 192 of the rearwardly propagating beam from the second fiber 131. As will be explained immediately below, the final four elements 138, 136, 120 and 118 operate in the inverse to the operations described with reference to FIGS. 9–15. Consequently, the rearwardly propagating polarization components 190 and 192 reach the third fiber 132 for output.

Figure 30:
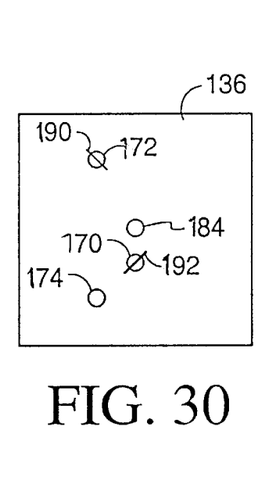
Figure 31:
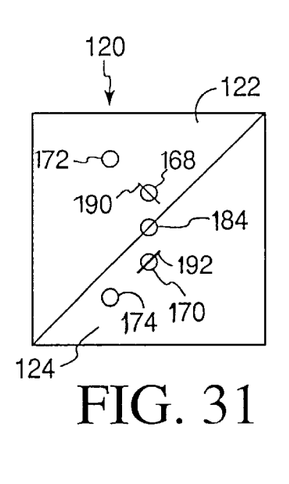

The first walk-off crystal 136 in the polarization combinor pair 135 shifts the sixth polarization component 192 to the position 170 upon reaching the rearward face of the second walk-off crystal 136 in the pair, as shown in FIG. 30. The crystal 136 shifts the fifth polarization component 192 to the position 168 in FIG. 31, as the polarization components reach the rearward face of the polarization mixer pair 134 described with reference to FIG. 8.

Figure 32:
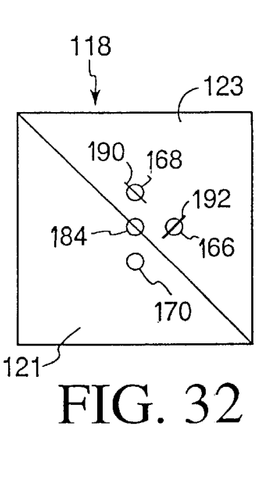

The upper portion 122 of the rearward split element 120 has no effect on the fifth polarization component 190, but the lower portion 124 causes the sixth polarization component 192 to be displaced to the window 166 of the third optical fiber, as shown at FIG. 32. While not shown in the drawings, the upper portion 123 of the split element 118 then shifts the fifth polarization component 190 into alignment with the window 166 for output of the two beam components along the third fiber.

Referring to FIGS. 7–32, the assembly 128 optically couples the first fiber 130 to the second fiber 131 and optically couples the second fiber 131 to the third fiber 132, but isolates the fibers from spurious transmissions.

What is claimed is:

1. A method of fabricating optical elements comprising steps of:

aligning more than two optical members in a side-by-side arrangement such that each optical member has at least one abutting surface that is adjacent to an abutting surface of an adjacent optical member in said arrangement and such that said adjacent optical members have different optical characteristics with respect to manipulating polarization components of light that is propagating in a direction parallel to said abutting surfaces; and segmenting each said optical member in a direction parallel to said abutting surfaces to form a plurality of discrete optical elements such that each optical element includes a segment from each of two adjacent optical members, thereby forming said each optical element to include a first portion having first optical characteristics and a second portion having second optical characteristics different than said first optical characteristics with respect to manipulating polarization components.

2. The method of claim 1 wherein said step of aligning said optical members is a step of fixing a plurality of walk-off crystals to a transparent substrate such that said optical members are in abutting relationship along said direction parallel to abutting surfaces to form a pattern in which walk-off directions of odd-numbered crystals are opposite to walk-off directions of even-numbered crystals.

3. The method of claim 2 wherein said step of segmenting said optical members includes dicing each of said walk-off crystals in said direction parallel to said abutting surfaces, thereby forming each optical element to include a region of said transparent substrate supporting a segment of one of said odd-numbered crystals and a segment of one of said even-numbered crystals.

4. The method of claim 3 wherein said step of segmenting said optical members further includes dicing each of said walk-off crystals and said transparent substrate perpendicular to said direction parallel to said abutting surfaces, thereby forming a plurality of said optical elements from each pair of odd-numbered and even-numbered crystals in said arrangement.

5. The method of claim 2 wherein said step of aligning said optical members includes utilizing an optically transparent epoxy to fix said optical members to said substrate, said optical members being walk-off crystals.

6. The method of claim 1 wherein said arrangement of optical members is a pattern of abutting walk-off crystals having alternating walk-off directions, said step of segmenting said optical members including dicing said arrangement with perpendicular first and second series of cuts, with cuts of said first series intersecting cuts of said second series only at interfaces of said abutting surfaces of said adjacent optical members, thereby forming said optical elements to have sides that are at acute angles to said walk-off directions and parallel to said interfaces.

7. The method of claim 1 wherein said step of aligning said optical members includes fixing said optical members to a transparent substrate such that said optical members abut adjacent optical members.

8. The method of claim 7 wherein said substrate is a glass substrate and said optical members are bars, said step of segmenting said optical members including dicing said bars in both a lengthwise direction and a widthwise direction to form said plurality of discrete optical elements.

9. The method of claim 1 wherein said step of segmenting is executed such that each optical element includes only said first and second portions.

* * * * *